Aug. 20, 1946.  C. H. MATTOON  2,405,970
SANDING APPARATUS FOR ROAD VEHICLES
Filed Jan. 19, 1945  2 Sheets-Sheet 2
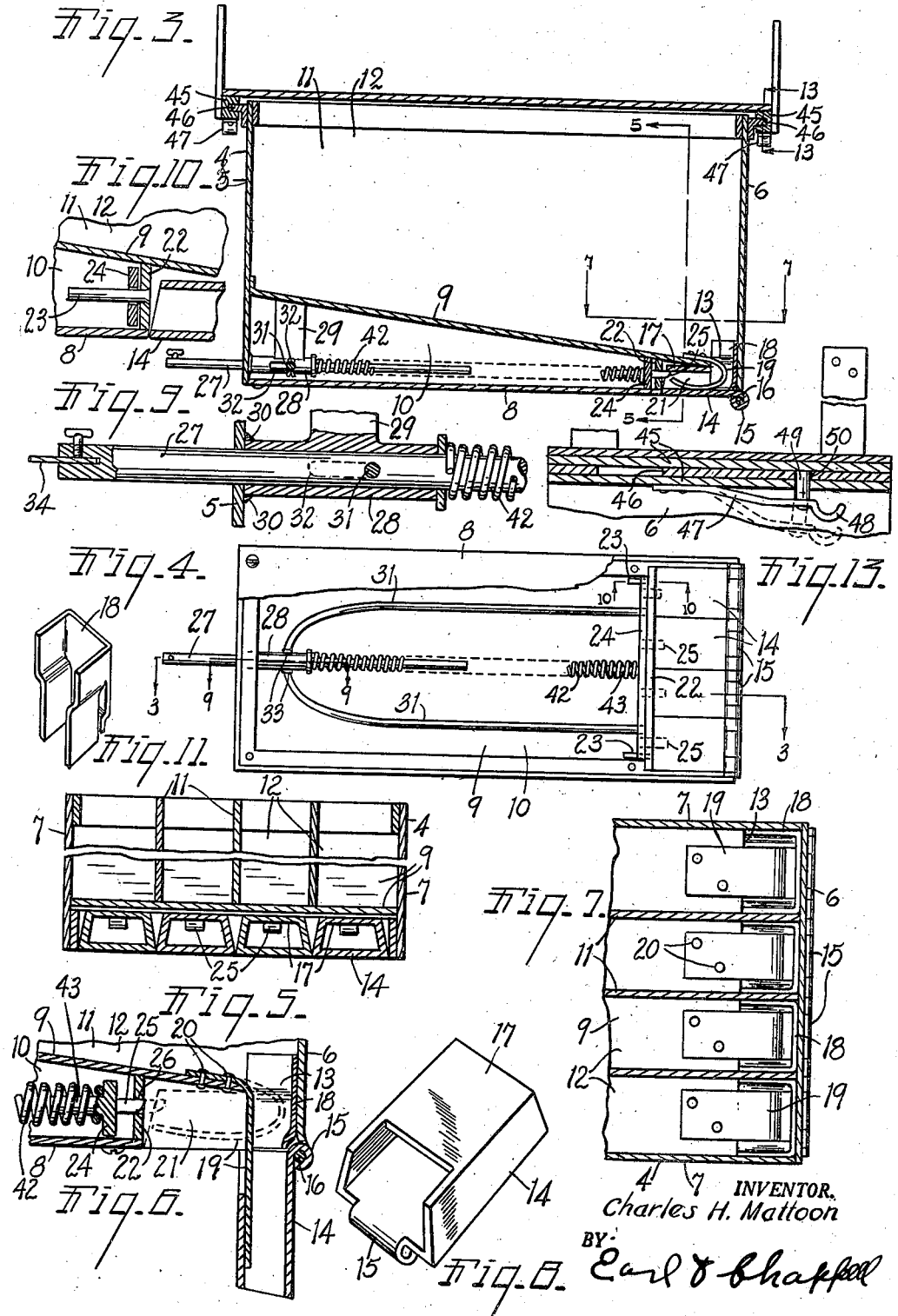
INVENTOR.
Charles H. Mattoon
BY Earl & Chappell
ATTORNEYS.

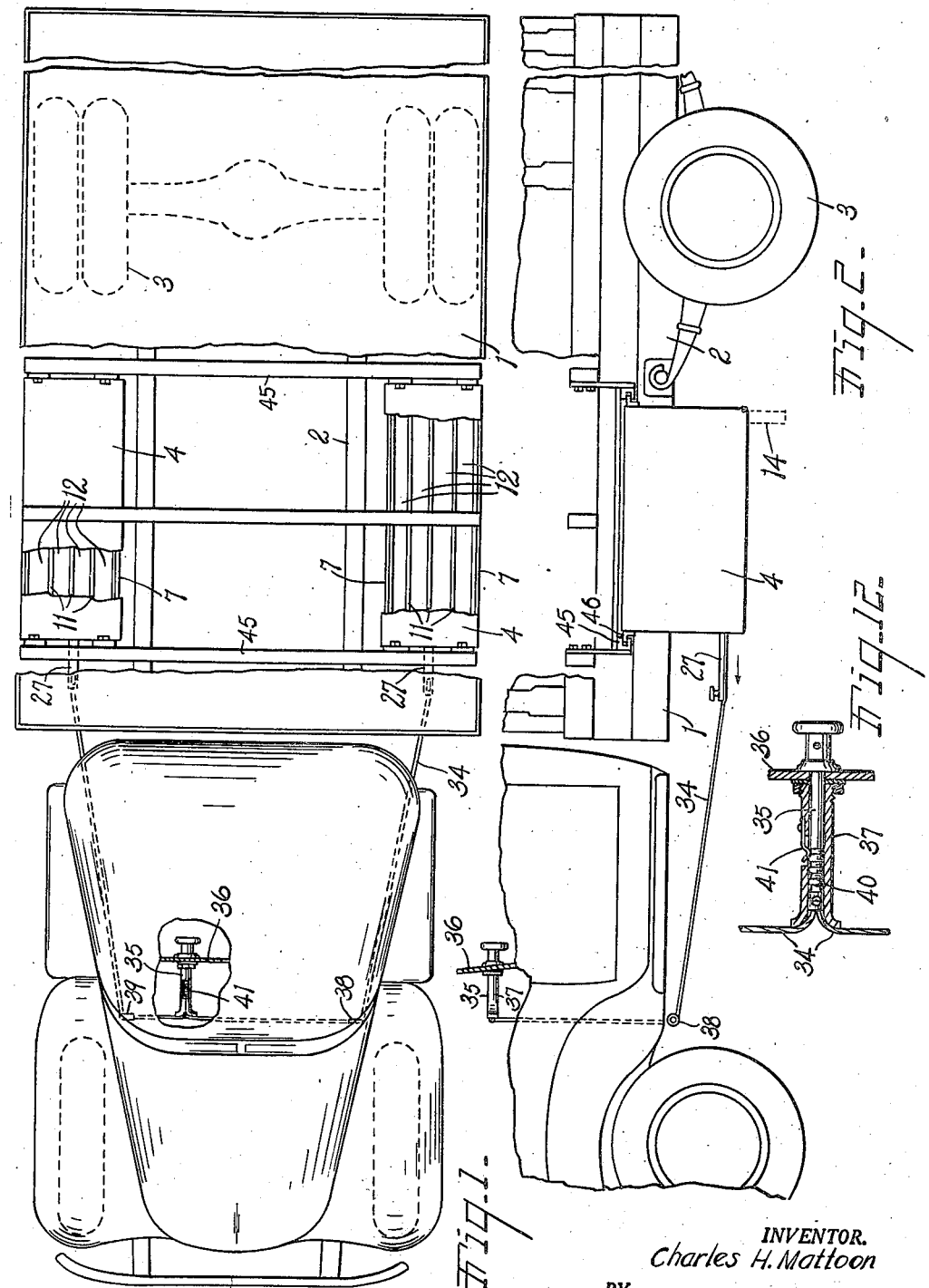

Patented Aug. 20, 1946

2,405,970

UNITED STATES PATENT OFFICE 2,405,970

SANDING APPARATUS FOR ROAD VEHICLES

Charles H. Mattoon, Kalamazoo, Mich.

Application January 19, 1945, Serial No. 573,589

20 Claims. (Cl. 291—32)

This invention relates to improvements in sanding apparatus for road vehicles.

The main objects of this invention are:

First, to provide a sanding apparatus for road vehicles such as trucks which is effective in positioning the sanding material relative to the traction wheels and so that the likelihood of its getting into bearing parts or being blown away as it is discharged is minimized.

Second, to provide an apparatus of this character in which a plurality of applications may be made with a minimum of waste of material.

Third, to provide a structure of this character which may be conveniently operated from the driver's seat, the driver knowing from the position of the control member what supply of sanding material he has in the apparatus.

Fourth, to provide an apparatus in which the hopper may be readily charged or replacement hoppers may be provided at way stations and readily mounted in the vehicle.

Objects relating to details and economies of the invention will appear from the description to follow. The invention is defined and pointed out in the claims.

A preferred embodiment of the invention is illustrated in the accompanying drawings, in which:

Fig. 1 is a fragmentary plan view of parts of a motor vehicle of the truck type having my invention embodied or incorporated therein, certain parts being shown conventionally.

Fig. 2 is a fragmentary side elevation, one of the discharge chutes being shown in open or discharging position by dotted lines.

Fig. 3 is an enlarged fragmentary view in section on the broken line 3—3 of Fig. 4.

Fig. 4 is an inverted view of one of the hoppers with the main or outer bottom partially broken away, the discharge chutes being shown in closed position.

Fig. 5 is a fragmentary view in vertical transverse section on line 5—5 of Fig. 3.

Fig. 6 is an enlarged fragmentary view in section corresponding to that of Fig. 3 with the latch bar retracted to release one of the chutes, the chute being shown in erected or discharging position.

Fig. 7 is a fragmentary horizontal section on line 7—7 of Fig. 3.

Fig. 8 is a rear perspective view of one of the chutes.

Fig. 9 is an enlarged detail view partially in section on line 9—9 of Fig. 4 showing details of the control means.

Fig. 10 is an enlarged fragmentary view partially in section on line 10—10 of Fig. 4 showing further details of the control means.

Fig. 11 is a perspective view of a discharge throat provided at the discharge end of the compartments for directing the sanding material to the open or erected chute.

Fig. 12 is an enlarged fragmentary view partially in section showing details of the manual control member.

Fig. 13 is an enlarged fragmentary view partially in section on a line corresponding to line 13—13 of Fig. 3 showing details of the means for removably retaining the hoppers.

I have illustrated my invention as embodied in a truck designated generally by the numeral 1 and having a chassis 2 provided with dual type traction wheels 3.

In this application I use the term "sanding" in a generic sense—that is, to include various types of so-called sanding materials such as sand or sand mixtures, cinders and the like.

In the embodiment illustrated, I provide two hoppers designated generally by the numeral 4 and comprising front wall 5, rear wall 6, the side walls 7. The outer bottom or main bottom 8 is secured to the lower edges of these side walls. The inner or compartment bottom 9 is rearwardly inclined and is spaced vertically from the bottom 8 to provide a chamber 10.

The hopper is provided with a plurality of longitudinal partitions 11 uniformly spaced to provide a plurality of side by side compartments 12. The rear wall of the inner bottom 9 terminates in spaced relation to the rear wall 6 of the hopper to provide downward discharge openings 13, there being a discharge opening for each compartment.

Each compartment is provided with a discharge chute 14 having a hinge knuckle 15 on its rear wall engaged by pintles 16 mounted in the lower edge of the rear wall. The upper edge of the front walls 17 of these discharge chutes 14 preferably terminate substantially below the upper edges of the other walls to provide a recess or opening as shown in Fig. 8.

It will be noted that the chutes are somewhat wedge-shaped, the advantage being that this permits their effective collapsing into side by side relation, as shown in Fig. 5, without wedging and without the necessity for great accuracy in manufacture, at the same time when closed they do present a substantially continuous surface for excluding mud and water which might result in the formation of ice and prevent the operation of the chutes.

To guide the material into the chutes when they are in open position I provide channel-shaped throat members 18 which are disposed in the discharge openings, the lower ends of these throats being of such dimensions as to effectively guide the material into the chutes—that is, on three sides, these three sides being supplemented by the strap-like joint closure and guide member 19 which is secured to the bottom of the compartment as by the rivets 20 to depend into the chutes. This is preferably of resilient material and when the chutes are in closed position takes the bowed form as shown by dotted lines in Fig. 6.

To prevent accumulations of snow or mud within the chutes, they are retracted into a space or chamber provided therefor, this space being designated by the numeral 21 and results from the transverse cross piece 22 arranged between the outer and inner bottom members 8 and 9 respectively as clearly shown in Figs. 3 and 6.

This cross piece is provided with forwardly projecting pins 23 which constitute means for slidably supporting the latch or bolt bar 24. This latch or bolt bar 24 is provided with bolts 25 of different lengths, these bolts projecting through holes 26 in the cross member 22. The bolts are graduated in length so that they successively release the chutes and it is contemplated that the compartment shall be of such size as to contain sufficient sanding material to meet the average condition or to deposit sanding material enough to meet the average situation requiring all the sanding material desirable. If one compartment is not sufficient a second compartment may be discharged.

It will be noted that when in open position the discharge chutes discharge the material quite closely to the surface of the pavement or highway and this has the advantage of discharging the material so that it is not likely to be blown away or blown into parts of the truck such as the brake parts which is highly objectionable.

The release rod 27 is slidably mounted in the tubular support 28 supported by the bracket 29 and also preferably welded at 30 to the front wall of the hopper, the release rod being connected by the yoke 31, the arms of which are connected to the latch bar, the bight of this yoke being passed through slots 32 in the support 28 and through the release rod. Cotter pins 33 prevent lateral movement of the yoke relative to the release rod and its support.

The control rods are connected by the cables 34 to the control member 35 mounted on the instrument board 36 of the vehicle in a suitable tubular support 37. These cables pass over suitable guides 38 and 39, see Figs. 1 and 2.

The manual control member is provided with a series of spaced notch-like keepers 40 engaged by the spring detent 41. The coiled spring 42 engaged at one end on the projecting end of the release rod and at the other by a projecting pin 43 acts to urge the latch bar to bolt engaging position. The detent 35, however, is of sufficient relative strength to hold the bolt bar in its retracted position.

With this arrangement, the bolt or latch bar may be retracted step by step to successively release the chutes, permitting them to swing to discharging position and when they are in collapsed position the discharge is cut off.

To permit re-charging or replacement of the hopper, the vehicle is provided with transverse slideways 45 adapted to receive slides 46 on the hopper, see Fig. 3. The slideways are provided with latches 47 having finger pieces 48 facilitating their disengagement, the latches having pins 49 engageable with holes 50 in the slides 46, see Fig. 13.

In practice, the material is provided with an anti-freeze ingredient. Freezing temperatures are likely to be encountered and it is important that the material be freely discharged.

I have illustrated and described my improvements in a highly practical embodiment thereof. I have not attempted to illustrate or describe various modifications and adaptations which I contemplate as it is believed that this disclosure will enable those skilled in the art to embody or adapt my invention as may be desired.

Having thus described my invention, what I claim as new and desire to secure by Letters Patent, is:

1. In a sanding apparatus for road vehicles, the combination of a hopper adapted for mounting on a vehicle chassis in front of a traction wheel thereof and comprising a material receptacle including a rear wall, an outer bottom and a rearwardly inclined inner bottom disposed with its rear end in spaced relation to the rear wall and a plurality of longitudinal partitions disposed above said inner bottom and extending from front to rear of the hopper to provide a plurality of relatively narrow individual material compartments having discharge openings at the rear ends thereof, a cross member disposed transversely across said hopper between its said outer and inner bottoms and in spaced relation to the rear wall thereof to provide a chute chamber open at the bottom thereof, a discharge chute for each of said compartments, the rear walls of said chutes being pivotally mounted on the lower edge of the rear wall of the hopper, said chutes being adapted to swing to a horizontal position within said chute chamber or to a vertical position in communication with the discharge openings of said compartments, the upper edges of the front walls of said chutes being substantially below the upper edges of their rear walls when said chutes are disposed in said vertical position, the lower ends of said chutes when in discharging position being adjacent the surface to be sanded, strap-like joint closure and guide members secured to said inner bottom to extend into said chutes, channel-shaped throat members disposed within said compartment discharge openings and conformed to guide the material to the upper end of said chutes, a latch bar slidably mounted on said cross member in front thereof and provided with a latch bolt for each of said chutes projecting through said cross member, said latch bolts being of different lengths whereby they successively release the discharge ends of said chutes to discharging position when the latch bar is retracted, a spring acting to urge said latch bar to engaging position, a release rod slidably mounted between said main and auxiliary hopper bottoms and operatively connected to said latch bar, a slidably mounted manual control member operatively connected to said release rod and having a longitudinal series of keepers, and a positioning detent for yieldably engaging said keepers whereby the latch bar may be actuated step by step to successively release the discharge ends of said chutes to discharging position.

2. In a sanding apparatus for road vehicles, the combination of a hopper adapted for mounting on a vehicle chassis in front of a traction wheel thereof and comprising a material receptacle including a rear wall, an outer bottom and a rearwardly inclined inner bottom disposed with its rear end in spaced relation to the rear wall and a plurality of longitudinal partitions disposed above said inner bottom and extending from front to rear of the hopper to provide a plurality of relatively narrow individual material compartments having discharge openings at the rear ends thereof, a cross member disposed across said hopper between its said outer and inner bottoms and in spaced relation to the rear wall thereof to provide a chute chamber open at the bottom thereof, a discharge chute for each of said compartments, the rear walls of said chutes being pivotally mounted on the lower edge of the rear wall of the hopper, said chutes being adapted to swing to a horizontal position within said chute chamber or to a vertical position in communication with the discharge openings of said compartments, a latch bar slidably mounted on said cross member in front thereof and provided with a latch bolt for each of said chutes projecting through said cross member, said latch bolts being of different lengths whereby they successively release the discharge ends of said chutes to discharging position when the latch bar is retracted, a spring acting to urge said latch bar to engaging position, a release rod slidably mounted between said main and auxiliary hopper bottoms and operatively connected to said latch bar, a slidably mounted manual control member operatively connected to said release rod and having a longitudinal series of keepers, and a positioning detent for yieldably engaging said keepers whereby the latch bar may be actuated step by step to successively release the discharge ends of said chutes to discharging position.

3. In a sanding apparatus for road vehicles, the combination of a hopper adapted for mounting on a vehicle chassis in front of a traction wheel thereof and comprising a material receptacle including a rear wall, an outer bottom and a rearwardly inclined inner bottom disposed with its rear end in spaced relation to the rear wall and a plurality of longitudinal partitions disposed above said inner bottom and extending from front to rear of the hopper to provide a plurality of relatively narrow individual material compartments having discharge openings at the rear ends thereof, a cross member disposed transversely across said hopper between its said outer and inner bottoms and in spaced relation to the rear wall thereof to provide a chute chamber open at the bottom thereof, a discharge chute for each of said compartments, the rear walls of said chutes being pivotally mounted on the lower edge of the rear wall of the hopper, said chutes being adapted to swing to a horizontal position within said chute chamber or to a vertical position in communication with the discharge openings of said compartments, the upper edges of the front walls of said chutes being substantially below the upper edges of their rear walls when said chutes are disposed in said vertical position, the lower ends of said chutes when in discharging position being adjacent the surface to be sanded, strap-like joint closure and guide members secured to said inner bottom to extend into said chutes, channel-shaped throat members disposed within said compartment discharge openings and conformed to guide the material to the upper ends of said chutes, and means for successively releasing the discharge ends of said chutes to discharging position.

4. In a sanding apparatus for road vehicles, the combination of a hopper adapted for mounting on a vehicle chassis in front of a traction wheel thereof and comprising a material receptacle including a rear wall, an outer bottom and a rearwardly inclined inner bottom disposed with its rear end in spaced relation to the rear wall and a plurality of longitudinal partitions disposed above said inner bottom and extending from front to rear of the hopper to provide a plurality of relatively narrow individual material compartments having discharge openings at the rear ends thereof, a cross member disposed transversely across said hopper between its said outer and inner bottoms and in spaced relation to the rear wall thereof to provide a chute chamber open at the bottom thereof, a discharge chute for each of said compartments, the rear walls of said chutes being pivotally mounted on the lower edge of the rear wall of the hopper, said chutes being adapted to swing to a horizontal position within said chute chamber or to a vertical position in communication with the discharge openings of said compartments, and means for successively releasing the discharge ends of said chutes to discharging position.

5. In a sanding apparatus for road vehicles, the combination of a hopper adapted for mounting on a vehicle chassis in front of a traction wheel thereof and comprising a material receptacle including a rear wall, a rearwardly inclined compartment bottom disposed with its rear end in spaced relation to the rear wall and a plurality of longitudinal partitions disposed above said auxiliary bottom and extending from front to rear of the hopper to provide a plurality of relatively narrow individual material compartments having discharge openings at the rear ends thereof, there being a space below said bottom adapted to receive a plurality of discharge chutes in side by side retracted position, pivotally mounted discharge chutes for each of said compartments, said chutes being adapted to swing to a horizontal position within said space or to a depending discharge position in communication with the discharge openings of said compartments, the upper edges of the front walls of said chutes being substantially below the upper edges of their rear walls when said chutes are disposed in said depending discharge position, the lower ends of said chutes when in discharging position being adjacent the surface to be sanded, strap-like joint closure and guide members secured to said inner bottom to extend into said chutes, channel-shaped throat members disposed within said compartment discharge openings and conformed to guide the material to the upper ends of said chutes, a slidable latch bar provided with a latch bolt for each of said chutes, said latch bolts being of different lengths whereby they successively release the discharge ends of said chutes to discharging position when the latch bar is retracted, a spring acting to urge said latch bar to engaging position, a release member operatively connected to said latch bar, a manual control member operatively connected to said release member and having a series of keepers, and a positioning detent for yieldably engaging said keepers whereby the latch bar may be actuated step by step to successively release the discharge ends of said chutes to discharging position.

6. In a sanding apparatus for road vehicles, the combination of a hopper adapted for mounting on a vehicle chassis in front of a traction wheel thereof and comprising a material receptacle including a rear wall, a rearwardly inclined compartment bottom disposed with its rear end in spaced relation to the rear wall and a plurality of longitudinal partitions disposed above said auxiliary bottom and extending from front to rear of the hopper to provide a plurality of relatively narrow individual material compartments having discharge openings at the rear ends thereof, there being a space below said bottom adapted to receive a plurality of discharge chutes in side by side retracted position, pivotally mounted discharge chutes for each of said compartments, said chutes being adapted to swing to a horizontal position within said space or to discharge position in communication with the discharge openings of said compartments, a slidable latch bar provided with a latch bolt for each of said chutes, said latch bolts being of different lengths whereby they successively release the discharge ends of said chutes to discharging position when the latch bar is retracted, a spring acting to urge said latch bar to engaging position, a release member operatively connected to said latch bar, a manual control member operatively connected to said release member and having a series of keepers, and a positioning detent for yieldably engaging said keepers whereby the latch bar may be actuated step by step to successively release the discharge ends of said chutes to discharging position.

7. In a sanding apparatus for road vehicles, the combination of a hopper adapted for mounting on a vehicle chassis in front of a traction wheel thereof and comprising a material receptacle including a rear wall, a rearwardly inclined compartment bottom disposed with its rear end in spaced relation to the rear wall and a plurality of longitudinal partitions disposed above said auxiliary bottom and extending from front to rear of the hopper to provide a plurality of relatively narrow individual material compartments having discharge openings at the rear ends thereof, there being a space below said bottom adapted to receive a plurality of discharge chutes in side by side retracted position, pivotally mounted discharge chutes for each of said compartments, said chutes being adapted to swing in a horizontal position within said space or to a depending discharge position in communication with the discharge openings of said compartments, the upper edges of the front walls of said chutes being substantially below the upper edges of their rear walls when said chutes are disposed in said depending discharge position, the lower ends of said chutes when in discharging position being adjacent the surface to be sanded, strap-like joint closure and guide members secured to said inner bottom to extend into said chutes, channel-shaped throat members disposed within said compartment discharge openings and conformed to guide the material to the upper ends of said chutes, and manually operated means for successively releasing the discharge ends of said chutes to discharging positions.

8. In a sanding apparatus for road vehicles, the combination of a hopper adapted for mounting on a vehicle chassis in front of a traction wheel thereof and comprising a material receptacle including a rear wall, a rearwardly inclined compartment bottom disposed with its rear end in spaced relation to the rear wall and a plurality of longitudinal partitions disposed above said auxiliary bottom and extending from front to rear of the hopper to provide a plurality of relatively narrow individual material compartments having discharge openings at the rear ends thereof, there being a space below said bottom adapted to receive a plurality of discharge chutes in side by side retracted position, pivotally mounted discharge chutes for each of said compartments, said chutes being adapted to swing to a horizontal position within said space or to discharge position in communication with the discharge openings of said compartments, and manually operated means for successively releasing the discharge ends of said chutes to discharging position.

9. In an apparatus of the class described, the combination of a hopper adapted for mounting on a vehicle chassis in front of a traction wheel thereof and having a plurality of compartments disposed in side by side relation and provided with inclined bottoms and having downward discharge openings, a discharge chute for each of said compartments swingably mounted in operative relation to said discharge opening to swing rearwardly to discharge position and adapted to swing to a horizontal non-discharge position, flexible joint closures and guide members secured to the bottoms of the compartment to extend into the chutes, a movably mounted latch bar provided with a bolt for each of said chutes, the bolts being of different lengths whereby the discharge ends of said chutes are successively released by the actuation of said latch bar in one direction, spring means urging said latch bar to bolt engaging position, and a control member operatively connected to said latch bar and provided with a positioning detent for releasably holding it in several adjusted positions whereby the latch bar may be actuated with a step by step movement to successively release the discharge ends of said chutes to discharging position.

10. In an apparatus of the class described, the combination of a hopper adapted for mounting on a vehicle chassis in front of a traction wheel thereof and having a plurality of compartments disposed in side by side relation and having downward discharge openings, a discharge chute for each of said compartments swingably mounted in operative relation to said discharge opening to swing rearwardly to discharge position and adapted to swing to a horizontal non-discharge position, a movably mounted latch bar provided with a bolt for each of said chutes, the bolts being of different lengths whereby the discharge ends of said chutes are successively released by the actuation of said latch bar in one direction, spring means urging said latch bar to bolt engaging position, and a control member operatively connected to said latch bar and provided with a positioning detent for releasably holding it in several adjusted positions whereby the latch bar may be actuated with a step by step movement to successively release the discharge ends of said chutes to discharge position.

11. In an apparatus of the class described, the combination of a hopper adapted for mounting on a vehicle chassis in front of a traction wheel thereof and having a plurality of compartments disposed in side by side relation and provided with inclined bottoms and having downward discharge openings, a discharge chute for each of said compartments swingably mounted in operative relation to said discharge opening to swing rearwardly to discharge position and adapted to swing to a horizontal non-discharge position, flexible joint closures and guide members secured to the bottoms of the compartment to extend into the chutes, and means for holding said chutes in said non-discharge position, said last named means including manually controlled means for releasing the discharge ends of said chutes to discharging position one at a time.

12. In an apparatus of the class described, the combination of a hopper adapted for mounting on a vehicle chassis in front of a traction wheel thereof and having a plurality of compartments disposed in side by side relation and having downward discharge openings, a discharge chute for each of said compartments swingably mounted in operative relation to said discharge opening to swing rearwardly to discharge position and adapted to swing to a horizontal non-discharge position, and means for holding said chutes in said non-discharge position, said last named means including manually controlled means for releasing the discharging ends of said chutes to discharging position one at a time.

13. In an apparatus of the class described, the combination of a hopper adapted for mounting on a vehicle chassis in front of a traction wheel thereof and having a plurality of compartments disposed in side by side relation and having downward discharge openings, a discharge chute for each of said compartments swingably mounted in operative relation to said discharge opening to swing rearwardly to discharge position and adapted to swing to a horizontal non-discharge position with a space provided therefor in said hopper below the bottoms of the compartments and in which position they constitute closures for said discharge openings, a movably mounted latch bar provided with a bolt for each of said chutes, the bolts being of different lengths whereby the discharge ends of said chutes are successively released by the actuation of said latch bar in one direction, spring means urging said latch bar to bolt engaging position, and a control member operatively connected to said latch bar and provided with a positioning detent for releasably holding it in several adjusted positions whereby the latch bar may be actuated with a step by step movement to successively release the discharge ends of said chutes to discharging position.

14. In an apparatus of the class described, the combination of a hopper adapted for mounting on a vehicle chassis in front of a traction wheel thereof and having a plurality of compartments disposed in side by side relation and having downward discharge openings, a discharge chute for each of said compartments swingably mounted in operative relation to said discharge opening to swing rearwardly to discharge position and adapted to swing to a horizontal non-discharge position with a space provided therefor in said hopper below the bottoms of the compartments and in which position they constitute closures for said discharge openings, and means for holding said chutes in said non-discharge position, said last named means including manually controlled means for releasing the discharge ends of said chutes to discharging position one at a time.

15. In a sanding apparatus, the combination of a hopper adapted for mounting on a road vehicle in advance of a traction wheel thereof and having a plurality of compartments each adapted to receive sanding material, each compartment having a downward discharge, a plurality of discharge chutes, one for each compartment swingingly mounted on said hopper to receive material from said discharge openings when in delivery position and freely swingable when in that position in a plane parallel to the plane of travel of the vehicle, there being a chamber on the under side of said hopper into which the several chutes may be retracted in side by side relation, said chamber including a wall extending across the open ends of the chutes when they are retracted into the chamber, the chutes when in retracted position constituting closures for said discharge openings, said chutes being of forwardly tapered section and being of such width at their rear sides as to present a substantially continuous surface when they are in retracted position, means for supporting said chutes in retracted position, and means for releasing the discharge ends of said chutes to discharging position.

16. In a sanding apparatus, the combination of a hopper adapted for mounting on a road vehicle in advance of a traction wheel thereof and having a plurality of compartments each adapted to receive sanding material, each compartment having a downward discharge, a plurality of discharge chutes, one for each compartment swingingly mounted on said hopper to receive material from said discharge openings when in delivery position, there being a chamber on the under side of said hopper into which the several chutes may be retracted in side by side relation, said chamber including a wall extending across the open ends of the chutes when they are retracted into the chamber, the chutes when in retracted position constituting closures for said discharge openings, said chutes being of forwardly tapered section and being of such width at their rear sides as to present a substantially continuous surface when they are in retracted position, means for supporting said chutes in retracted position, and means for releasing the discharge ends of said chutes to discharging position.

17. In a sanding apparatus, the combination of a hopper adapted for mounting on a road vehicle in advance of a traction wheel thereof and having a plurality of compartments each adapted to receive sanding material, each compartment having a downward discharge, a plurality of discharge chutes, one for each compartment swingingly mounted on said hopper to receive material from said discharge openings when in delivery position, there being a chamber on the under side of said hopper into which the several chutes may be retracted in side by side relation, said chamber including a wall extending across the open ends of the chutes when they are retracted into the chamber, said chutes being of forwardly tapered section and being of such width at their rear sides as to present a substantially continuous surface when they are in retracted position, means for supporting said chutes in retracted position, and means for releasing the discharge ends of said chutes to discharging position.

18. In a sanding apparatus, the combination of a hopper adapted for mounting on a road vehicle in advance of a traction wheel thereof and having a compartment adapted to receive sanding material, said compartment having a downward discharge, a discharge chute swingingly mounted on said hopper to receive material from said discharge when in delivery position, there being a chamber on the under side of said hopper into which the chute may be retracted, said chamber including a wall extending across the discharge end of the chute when retracted into the chamber, means for supporting said chute in retracted position, and means for releasing the discharge end of said chute to discharge position.

19. In a sanding apparatus, the combination with a hopper adapted for mounting on a road vehicle in advance of a traction wheel thereof and having a plurality of compartments each adapted to receive sanding material, each compartment having a downward discharge, a plurality of discharge chutes, one for each compartment swingingly mounted on said hopper to receive material from said discharge openings when in delivery position and freely swingable when in that position to a retracted position and swingable in a plane parallel to the plane of travel of the vehicle, means for supporting said chutes in retracted position, and means for successively releasing the discharge ends of said chutes to discharging position.

20. In a sanding apparatus, the combination with a hopper adapted for mounting on a road vehicle in advance of a traction wheel thereof and comprising a plurality of compartments each adapted to receive sanding material, each compartment having a downward discharge, a plurality of discharge chutes, one for each compartment swingingly mounted to receive material from said discharge openings when in delivery position, a chamber on the under side of said hopper into which the several chutes may be retracted in side by side position, said chamber including a wall extending across the open ends of the chutes when they are retracted into the chamber, said chutes being of such width at their rear sides as to present a substantially continuous surface when they are in retracted position, means for supporting said chutes in retracted position, and means for successively releasing the discharge ends of said chutes to discharging position.

CHARLES H. MATTOON.